(12) United States Patent
Patel

(10) Patent No.: US 10,205,562 B1
(45) Date of Patent: Feb. 12, 2019

(54) METHOD AND APPARATUS FOR ERROR CORRECTION

(71) Applicant: MBIT WIRELESS, INC., Irvine, CA (US)

(72) Inventor: Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 79 days.

(21) Appl. No.: 15/397,078

(22) Filed: Jan. 3, 2017

(51) Int. Cl.
*H04L 1/18* (2006.01)
*H04L 1/08* (2006.01)
*H04L 1/16* (2006.01)
*H04L 1/00* (2006.01)

(52) U.S. Cl.
CPC .......... *H04L 1/1845* (2013.01); *H04L 1/0045* (2013.01); *H04L 1/08* (2013.01); *H04L 1/1607* (2013.01); *H04L 1/189* (2013.01)

(58) Field of Classification Search
CPC .............................. H04L 1/1845; H04L 1/189
See application file for complete search history.

(56) References Cited

U.S. PATENT DOCUMENTS

| | | | | |
|---|---|---|---|---|
| 3,760,371 A * | 9/1973 | Pitroda | ..................... | H04J 3/07 714/797 |
| 4,803,685 A * | 2/1989 | Oget | ..................... | H04L 1/0009 714/749 |
| 5,321,703 A * | 6/1994 | Weng | ..................... | G06F 11/10 714/761 |
| 5,463,646 A * | 10/1995 | Dillon | ..................... | G06F 11/08 375/342 |
| 5,737,118 A * | 4/1998 | Sugaya | ................. | H01S 3/1301 359/341.43 |
| 5,968,197 A * | 10/1999 | Doiron | .................... | H04L 1/188 714/748 |
| 6,523,148 B1 * | 2/2003 | Junghans | .................. | H04L 1/08 375/342 |
| 9,767,318 B1 * | 9/2017 | Dropps | .................... | G06F 21/72 |
| 2003/0112669 A1 * | 6/2003 | Fukushima | ........ | G11B 20/1809 365/200 |
| 2010/0077279 A1 * | 3/2010 | Kim | .................... | G06F 11/1068 714/755 |
| 2011/0185248 A1 * | 7/2011 | Linskey | ................ | H04L 1/0061 714/748 |

* cited by examiner

*Primary Examiner* — Joseph D Torres
(74) *Attorney, Agent, or Firm* — Lerner, David, Littenberg, Krumholz & Mentlik, LLP

(57) ABSTRACT

Error detection and correction techniques are employed in many digital communication systems. There may be multiple error detection and correction stages in a single communication system to provide a good balance of latency and retransmissions for reliable communication. Despite multiple levels of error detection and correction, there may be some residual errors. Many applications may require completely error free communication. A method and apparatus are disclosed for a receiver that may use the already received erroneous versions of transmitted and retransmitted packet or file to perform error correction without requesting additional retransmissions.

20 Claims, 8 Drawing Sheets

METHOD AND APPARATUS FOR ERROR CORRECTION

BACKGROUND

Error detection and correction techniques may be used in many digital communication systems to enable reliable delivery of data over unreliable communication channels. Many communication channels are subject to channel noise, fading, interference and other impairments and thus errors may be introduced during transmission from a transmitter to a receiver. Error detection is the detection of errors caused by channel impairments during transmission from the transmitter to the receiver. Error correction is the detection of errors and reconstruction of the original, error free data, in most cases.

Error correction techniques may be grouped into two types of methods. In the Automatic Repeat reQuest (ARQ) method, an error detection scheme is combined with requests for retransmission of erroneous data. Every block of data received may be checked using the error detection code employed, and if the check fails, retransmission of the data may be requested. The error detection, requesting retransmission and actually doing the retransmission may be done repeatedly, until the data can be received error free. In the Forward Error Correction (FEC) method, the sender encodes the data using an Error Correction Code (ECC) prior to transmission. The additional information (i.e., redundancy) added by the ECC is used by the receiver to recover the original data even though errors may have been introduced during propagation over a channel. In general, the recovered data is deemed to be the most likely original data transmitted by the transmitter.

Some digital communication systems may employ multiple levels of error detection and correction methods. For example, ARQ and FEC may be combined, such that some errors are corrected without retransmission and other errors that are not correctable by FEC are corrected via a request for retransmission. This combination of FEC and ARQ is often referred to as Hybrid ARQ (HARQ).

The Open System Interconnection (OSI) model defines a networking framework to implement communication network protocols in up to seven layers with each layer responsible for a particular type of functionality as illustrated in FIG. 1. A layer serves the layer above it and is served by the layer below it. For example, a layer that provides error-free communication across a network provides the path needed by applications above it, while it uses the next lower layer to send and receive packets of that path. A block of data along with required headers and trailers is referred to herein as a packet. The lowest layer in the OSI model is the physical layer and it provides the basic medium for communication. It may also include some form of error detection or error correction in the form of FEC. The next layer above the physical layer is the data link layer. One of the functionalities of the data link layer is the error detection and correction on the received data provided by the physical layer. The data link layer may typically employ ARQ method of error detection and correction whereas the physical layer may typically employ FEC method of error correction. Usually, the FEC method incurs much less delay (latency) compared to ARQ method which uses sending of retransmission requests and retransmissions which inherently take longer time compared to a single initial transmission with FEC.

Each layer in the OSI model may add a header to a block of user payload data to be transmitted. A header is supplemental data placed at the beginning of a block of user payload data to be transmitted. A header may contain various information that describes the content of the block of payload data. For example, the header may include the length of the data, serial number of the packet, source address, destination address, etc. The actual header contents depend on the particular layer and the particular protocol being used. Similarly, a trailer is supplemental data placed at the end of a block of user payload data to be transmitted. A trailer may contain various information that may help identify the end of the payload data or may help validate the integrity of the data. For example, the trailer may include a checksum or Cyclic Redundancy Check (CRC) for error detection. FIG. 1 illustrates a header and a trailer being added to the payload data at each layer of the OSI model. In any particular implementation of a communication system, some protocol layers may have only headers, only trailers, or both.

The combination of FEC or HARQ at physical layer and ARQ at data link layer may provide a good balance of latency and retransmissions for reliable communication. However, due to a number of reasons, additional error control mechanisms may be used at higher protocol layers in the OSI model. For example, the Internet Protocol v4 (IPv4) used at the network layer (the layer above data link layer) employs a header checksum to ensure reliable operation. In another example, the Transmission Control Protocol (TCP) used at the transport layer (the layer above network layer), may employ retransmission protocols similar to the ARQ used at the data link layer. The residual packet error rate refers to the remaining errors after the application of the error detection and/or correction method used at a particular layer. The residual error rate may be, for example, 1% after the application of error detection and/or correction at the physical layer. The residual error rate may be, for example, 0.1% after the application of error detection and/or error correction at the data link layer. Many applications such as email, file transfer, financial transactions, etc. may require completely error free communication. To provide a completely error free communication, additional level ARQ may be used at higher layers, for example in TCP at Transport layer. This additional level of error detection and correction may be further continued up to application layer depending on the type of application being used and the required degree or reliability. In some cases, it may be possible, although with infinitesimally small probability, that there are undetected errors at the application layer. This may, for example, occur in case of large file transfer, for example, exceeding 1 GByte. In such cases, the file transfer may be successful but its contents may not be correct while the user may be unaware of the errors.

SUMMARY

A method and apparatus are disclosed for a receiver that may use the already received erroneous version of a transmitted and retransmitted packet or file to perform error correction without requesting additional retransmissions.

In accordance with an aspect of the present disclosure, a method for error correction in a communication network may include controlling, by a processing device, storing, as erroneous versions of a same block of data, a plurality of versions of the same block of data received at a communication device which are determined to be erroneous; and combining each of the erroneous versions of the same block of data, by applying a majority decision criterion for each bit position of the same block of data determined to have a mismatch of values respectively among the erroneous versions of the same block of data, to obtain an error free version of the same block of data.

In one alternative, the method may include controlling, by the processing device, determining, for each given bit position of each of the erroneous versions of the same block of data, whether a value of the given bit position in one of the erroneous versions of the same block of data is different from a value of the given bit position in another of the erroneous versions of the same block of data.

In one alternative, a number of the erroneous versions of the same block of data may be at least three.

In one alternative, the method may include, when the number is an even value and a determination by applying the majority decision criterion to the erroneous versions of the same block of data is a tie for at least one bit position of the same block of data, controlling, by the processing device, requesting retransmission of the same block of data.

In one alternative, each said version of the same block of data received may be a version of a same packet including a header indicating a serial number and a payload data portion, in which in a given version of the same packet received the header may not be encoded separately from the payload data portion, and the method may further include controlling, by the processing device, determining a serial number of an erroneous version of a first packet received, by examining serial numbers respectively of an error-free version of at least one second packet received before and an error-free version of at least one third packet received after the erroneous version of the first packet is received.

In one alternative, each said version of the same block of data received may be a version of a same packet, and wherein each said erroneous version of the same packet may include a header of same length and a payload data portion, in which in each said erroneous version of the same packet the header may not be encoded separately from the payload data portion, and the method may further include controlling, by the processing device, applying the majority decision criterion to a portion of the headers respectively of the erroneous versions of the same packet, wherein the portion in each of the headers includes a same content at a time of retransmission of a given version of the same packet.

In one alternative, each said version of the block of data received may be a version of a same packet, and wherein each said erroneous version of the same packet may include a header and a payload data portion, in which in each said erroneous version of the same packet the header may not be encoded separately from the payload data portion, in which the headers of the erroneous versions of the same packet respectively may have different bit lengths, and wherein each said erroneous version of the same packet may have a length L in bits and a maximum header length in bits of $H_{max}$, and the method may further include controlling, by the processing device, applying the majority decision criterion to a last $L-H_{max}$ bit positions respectively in the erroneous versions of the same packet.

In one alternative, the same block of data may be a same file.

In one alternative, the method may further include controlling, by the processing device, transmitting an acknowledgement indicating successful receipt of a first block of data which is a first packet without a header, after applying the majority decision criterion to erroneous versions of the first packet determined based on predetermined information indicating each of a plurality of erroneous versions of given packets received corresponds to a respective given erroneous version of the first packet.

In accordance with an aspect of the present disclosure, an apparatus for error correction in a communication network may include circuitry configured to control storing, as erroneous versions of a same block of data, a plurality of versions of the same block of data received at a communication device which are determined to be erroneous; and combining each of the erroneous versions of the same block of data, by applying a majority decision criterion for each bit position of the same block of data determined to have a mismatch of values respectively among the erroneous versions of the same block of data, to obtain an error free version of the same block of data.

In one alternative of the apparatus, the circuitry may be configured to control determining, for each given bit position of each of the erroneous versions of the same block of data, whether a value of the given bit position in one of the erroneous versions of the same block of data is different from a value of the given bit position in another of the erroneous versions of the same block of data.

In one alternative of the apparatus, a number of the erroneous versions of the same block of data may be at least three.

In one alternative of the apparatus, the circuitry may be configured to control, when the number is an even value and a determination by applying the majority decision criterion to the erroneous versions of the same block of data is a tie for at least one bit position of the same block of data, requesting retransmission of the same block of data.

In one alternative of the apparatus, each said version of the same block of data received may be a version of a same packet including a header indicating a serial number and a payload data portion, in which in a given version of the same packet received the header may not be encoded separately from the payload data portion, and wherein the circuitry may be configured to control determining a serial number of an erroneous version of a first packet received, by examining serial numbers respectively of an error-free version of at least one second packet received before and an error-free version of at least one third packet received after the erroneous version of the first packet is received.

In one alternative of the apparatus, each said version of the same block of data received may be a version of a same packet, and wherein each said erroneous version of the same packet may include a header of same length and a payload data portion, in which in each said erroneous version of the same packet the header may not be encoded separately from the payload data portion, and wherein the circuitry may be configured to control applying the majority decision criterion to a portion of the headers respectively of the erroneous versions of the same packet, wherein the portion in each of the headers includes a same content at a time of retransmission of a given version of the same packet.

In one alternative of the apparatus, each said version of the block of data received may be a version of a same packet, and wherein each said erroneous version of the same packet may include a header and a payload data portion, in which in each said erroneous version of the same packet the header may be not encoded separately from the payload data portion, in which the headers of the erroneous versions of the same packet respectively may have different bit lengths, and wherein each said erroneous version of the same packet may have a length L in bits and a maximum header length in bits of $H_{max}$, and wherein the circuitry may be configured to control applying the majority decision criterion to a last $L-H_{max}$ bit positions respectively in the erroneous versions of the same packet.

In one alternative of the apparatus, the same block of data may be a same file.

In one alternative of the apparatus, the circuitry may be configured to control transmitting an acknowledgement indicating successful receipt of a first block of data which is a first packet without a header, after applying the majority decision criterion to erroneous versions of the first packet determined based on predetermined information indicating each of a plurality of erroneous versions of given packets received corresponds to a respective given erroneous version of the first packet.

In accordance with an aspect of the present disclosure, a wireless communication device may include a receiver to receive a wireless communication; and a processing device configured for error correction, wherein the processing device may be configured to control storing, as erroneous versions of a same block of data, a plurality of versions of the same block of data received at the wireless communication device which are determined to be erroneous; and combining each of the erroneous versions of the same block of data, by applying a majority decision criterion for each bit position of the same block of data determined to have a mismatch of values respectively among the erroneous versions of the same block of data, to obtain an error free version of the same block of data.

In one alternative of the wireless communication device, the processing device may be configured to control determining, for each given bit position of each of the erroneous versions of the same block of data, whether a value of the given bit position in one of the erroneous versions of the same block of data is different from a value of the given bit position in another of the erroneous versions of the same block of data.

DETAILED DESCRIPTION

Figure 1:
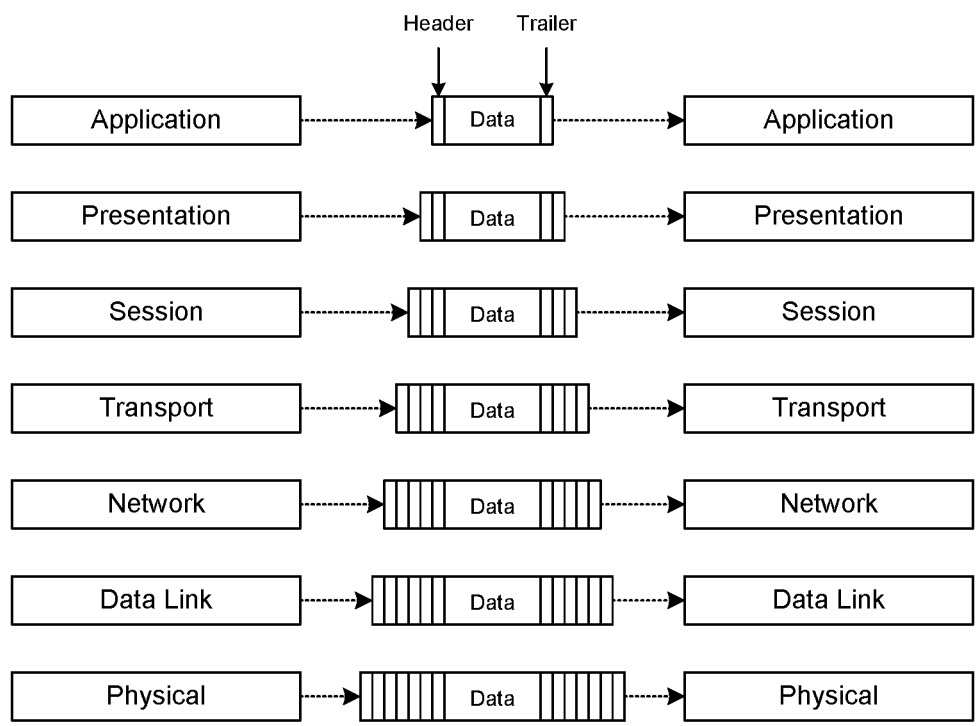
FIG. 1 illustrates the Open System Interconnection (OSI) model of communication systems framework

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Figure 2:
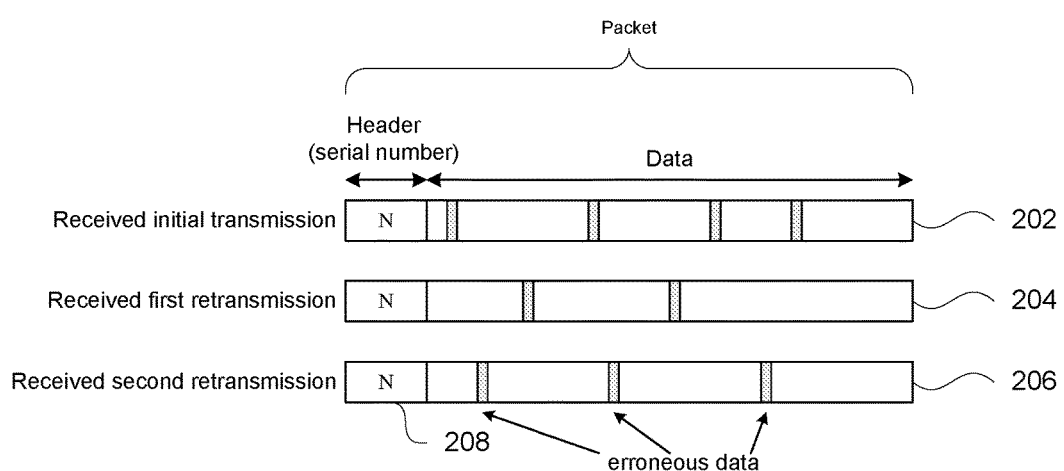
FIG. 2 illustrates an example error detection and correction scenario according to the aspects of the present disclosure.

According to an aspect of the present disclosure, a receiver of a protocol entity may save multiple erroneously received versions of the same packet, combine them by applying a majority decision criterion for each bit of the packet to obtain an error free version of the received packet. An example of the disclosed method is illustrated in FIG. 2. In FIG. 2 three different versions of the same packet received at the receiver are shown: the first received initial transmission 202, the first received retransmission 204, and the second received retransmission 206. Each of the three received packets corresponds to the same transmitted packet with serial number N in the header 208. Each of the received packets may contain erroneous data as indicated by shaded areas in FIG. 2. Due to the randomness of errors, the location of errors may be different in each of the three received packets. Since each of the three received packets correspond to the same transmitted packet with serial number N, a majority decision criteria may be applied to the three versions of the received packets. Specifically, if the value of the data for a particular bit position in the received packet is the same in two of the received versions of the packet, and the value of the bit in the same position in the third received packet is different from the value in the other two packets, it may be interpreted to be erroneous and the received bit value for that bit position may be interpreted to be the value that is common to the two received packets. This majority decision criterion may be applied to every bit position where there is mismatch of the values in the three received packets.

Figure 3:
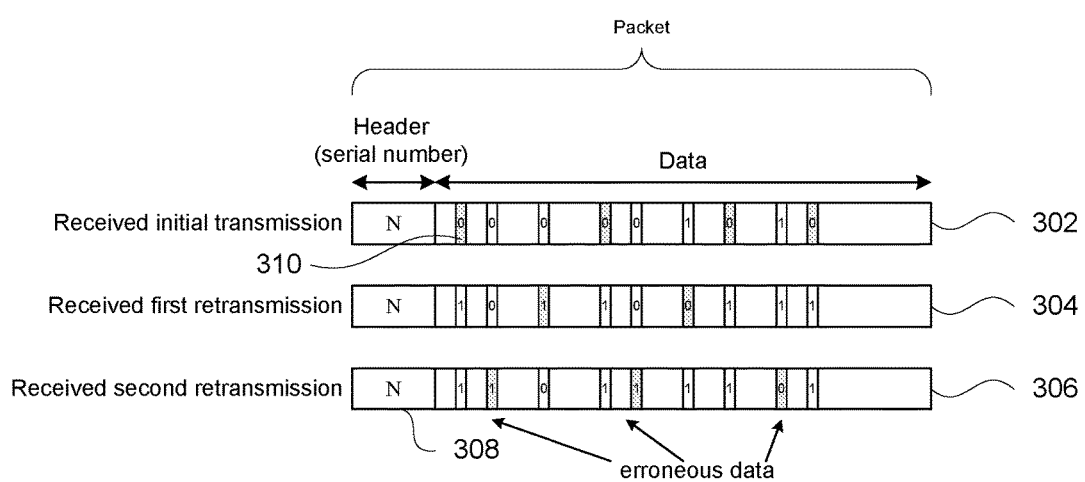
FIG. 3 illustrates an example error detection and correction scenario with specific values of erroneous bits according to the aspects of the present disclosure.

A further specific example is shown in FIG. 3 where specific values for the erroneous bit positions (shaded) in each packet and specific values of bits in the corresponding positions in the other received packets are shown. As can be observed from FIG. 3, the value of the first erroneous bit position 310 in the received initial transmission 302 is '0' whereas the values of the corresponding bit positions in the received first retransmission 304 and the received second retransmission 306 are '1' and based on the majority criterion, the true value of that particular bit position is deemed to be '1'. Such majority criterion decision is applied at every bit position where the three values of the bits in all three received versions of the packet do not match. In this manner, even though all three received versions of the packet are erroneous individually, all the erroneous bits in the different received versions of the packet may be corrected and a complete received packet without any errors may be recovered. According to an aspect of the present disclosure, a priori, the receiver may only know that a received packet as a whole may be in error but may not know the specific bits that are in error. According to an aspect of the present disclosure, when there are more than three versions of the packet, only after the comparison of all the received bits at each position it may become known that a value of one or more bit positions in one packet is different from a value of a respective bit position of at least one of the other packets. In an embodiment where there are three versions of the packet, an error at a bit position may become known when a value at a bit position in one packet is different from a value of the same bit position in the other two packets.

According to an aspect of the present disclosure, at least three different versions of the same packet are required at the receiver to apply the majority criterion. It may be possible that there may be uncorrectable errors in the three received versions of the same packet. For example, if the two of the received packets have errors in the same bit position, then the majority criterion based decision may incorrectly decide that the erroneous value is the correct value. Such uncorrectable errors may be detected by applying the normal error detection methods such as CRC after the majority criterion based processing is completed. According to an aspect of the present disclosure, the majority criterion decision may be applied with a greater number of received versions of the signal, such as four, five, etc. According to an aspect of the present disclosure, when the number of received versions of the signal is even, for example four, there may be a tie in the majority criterion decision and such tie decision may be used as an indication of uncorrectable error by the majority criterion. This may used to request additional retransmissions.

Figure 4:
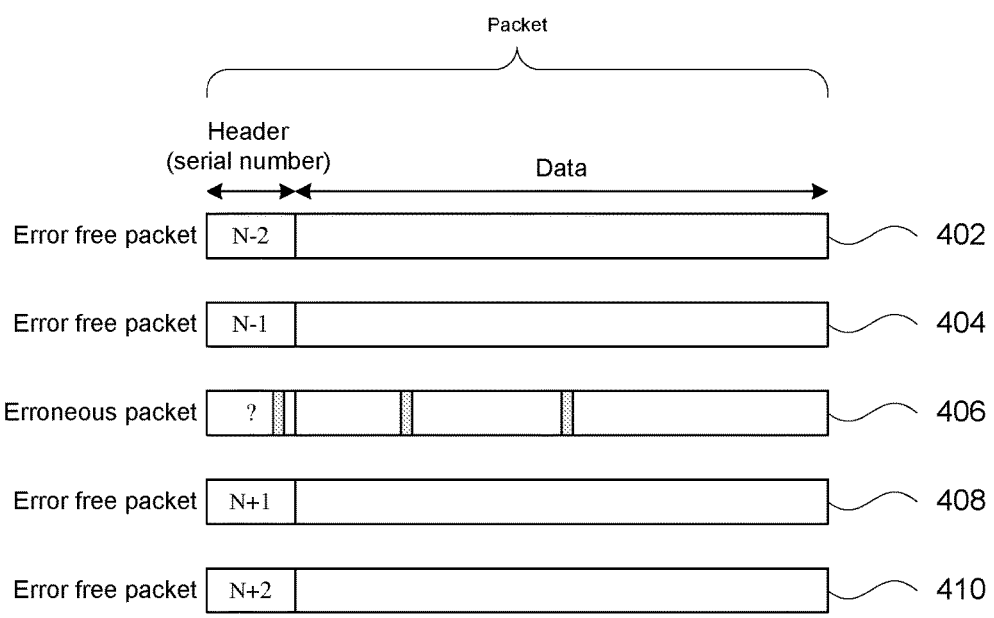
FIG. 4 illustrates an example scenario for estimation of serial number of a packet according to the aspects of the present disclosure.

The serial number of a received packet may be determined based on the header of the received packet. In some communication systems, the header may be separately encoded and its integrity may be ensured independent of the payload data portion of the packet. In communication systems in which a header is not separately encoded, i.e., if a packet is in error then the content of the header may be erroneous as well and as such the different received packets cannot be identified as having the same or different serial numbers. According to an aspect of the present disclosure, the serial number of a received packet may be estimated by examining the serial numbers of the error-free packets received before and after the unsuccessfully received packet. An example of this method is illustrated in FIG. 4. The packets 402, 404, 406, 408 and 10 may be received in that chronological order. Further, the packets 402, 404, 408 and 410 may be received error free and their serial numbers may be extracted from the header. Based on the chronological order of reception and the header of the successfully received packets, the serial number of the erroneous packet may be estimated to N.

In some communication protocols, the contents of the header may change during a retransmission even if the payload data content may not change. One example of such scenarios includes the use of extensible headers that may provide additional control information for the management of the protocol and the network. In another example, timestamps may be used in a header to keep track of congestion and other delays in the network. According to an aspect of the present disclosure, the majority criterion may be applied to packets with headers of fixed length but varying contents as follows. For example, if a header portion of a protocol is known to be fixed length but known to have different header content (at least in part) for retransmissions, the majority criterion may be applied to the portion of the packet that is known to remain the same across retransmissions. Since the packet size may be large and the portion of a header that may vary across retransmissions may be relatively small, the likelihood of errors being located in those varying areas may be small. Therefore, the likelihood of being able to correct the errors using the majority criterion may remain very high.

Figure 5:
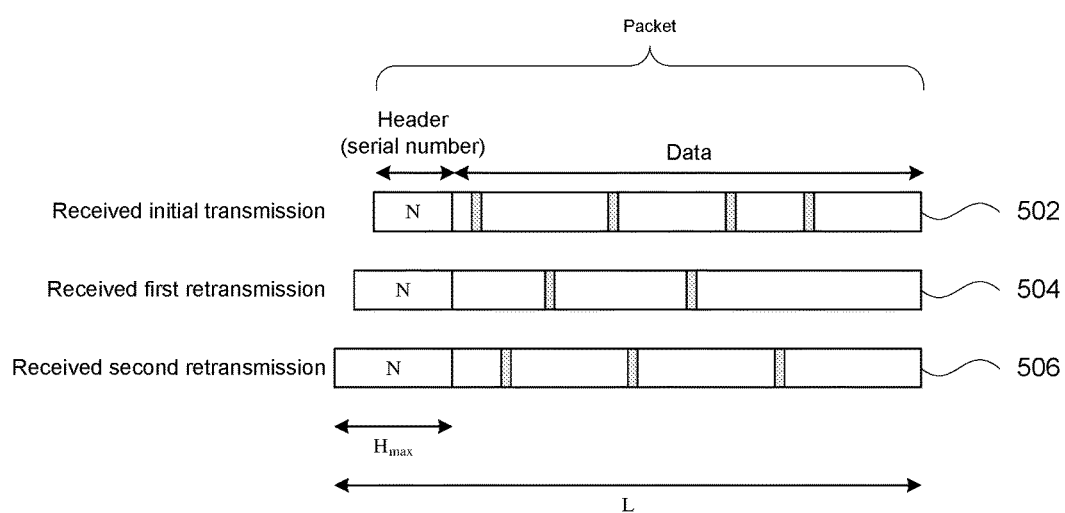
FIG. 5 illustrates an example scenario for applying the majority criterion when the header size of different versions of the received packets of the same transmitted packet may be different according to the aspects of the present disclosure.

According to an aspect of the present disclosure, if a header portion of a protocol is known to be of variable length, then the majority criterion may be applied to the non-header portion of the received packet as follows. As illustrated in FIG. 5, let the length in bits of the entire packet be denoted by L and let the maximum length in bits of a header be denoted by $H_{max}$. Then the last L–$H_{max}$ bits of the three received packets may be still be used for majority criterion based error correction. Similar to the case of header of fixed length but varying content, the variable length header portion is relatively small portion of the entire packet, the likelihood that an error is present in the header portion of the packet may be small and therefore the likelihood of being able to correct the error using majority criterion may remain high.

According to an aspect of the present disclosure, the majority criterion may be applied to a set of received files that may have errors in them individually and get an error free version of the received file.

According to an aspect of the present disclosure, the majority criterion may be applied to communication systems or packets that may not have any headers. For example, some communications system may operate in stop-and-wait mode where the transmitting entity may not send a new packet until a previously transmitted packet is successfully transmitted and acknowledged by its receiver. In such cases, it is known a priori at the receiver that all the erroneous received packets correspond to the same transmitted packet.

Aspects of the present disclosure may be applied to any communication system that may employ some form of ARQ retransmission protocol. Examples of such communication systems include the TCP/IP based internet, the $3^{rd}$ Generation Partnership Project (3GPP) Long Term Evolution (LTE), 3GPP Wideband Code Division Multiplexing (WCDMA), Global System for Mobile Communications (GSM), CDMA, Institute of Electrical and Electronics Engineers (IEEE) 802.11 based Wireless Local Area Network (WLAN), Bluetooth, Ethernet, etc.

Figure 6:
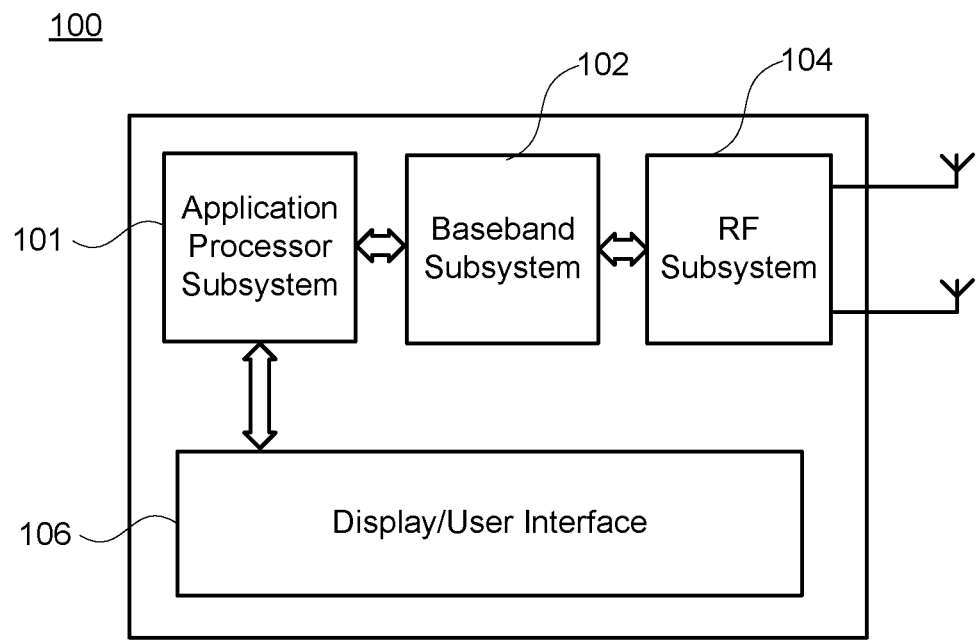
FIG. 6 illustrates a wireless mobile station diagram, which may be employed with aspects of the disclosure described herein.

By way of example only, the above-described method may be implemented in a user device such as a wireless mobile station (MS) 100 in FIG. 6.

As shown in FIG. 6, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 7:
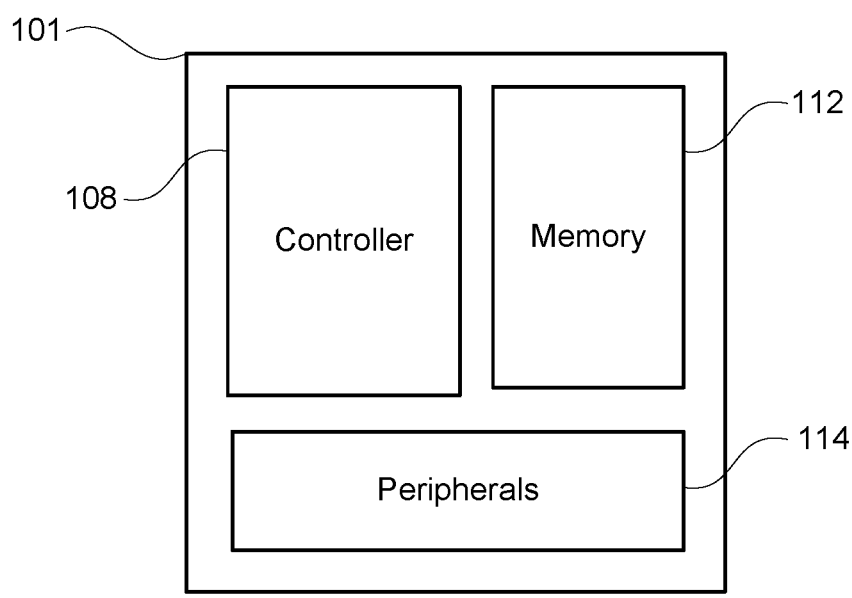
FIG. 7 illustrates an application processor subsystem for a wireless mobile station, which may be employed with aspects of the disclosure described herein.
Figure 8:
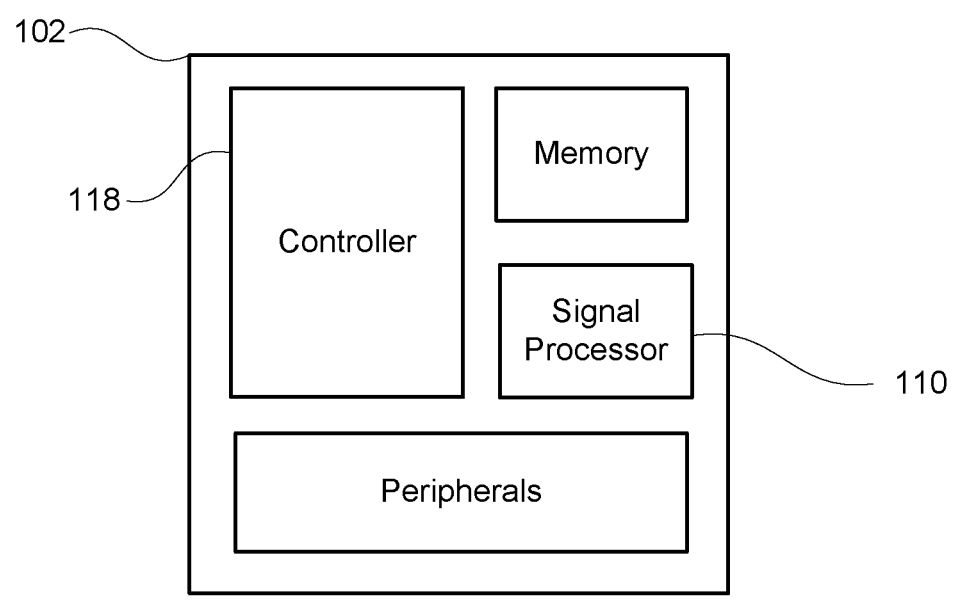
FIG. 8 illustrates a baseband subsystem for a wireless mobile station, which may be employed with aspects of the disclosure described herein.
Figure 9:
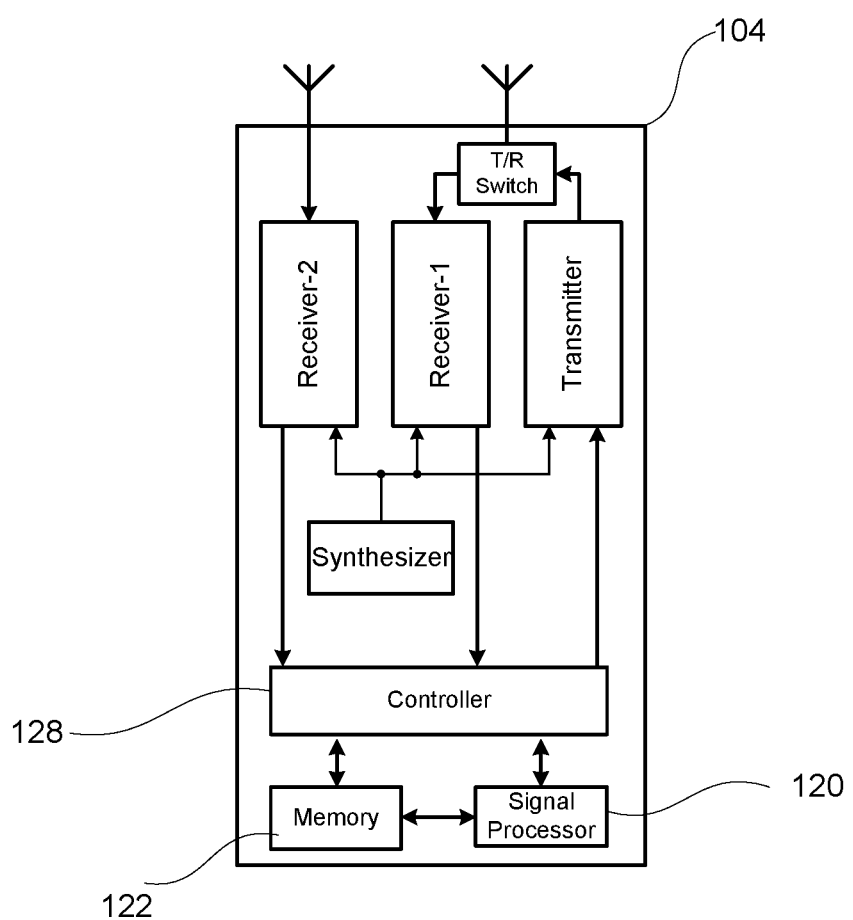
FIG. 9 illustrates a radio frequency (RF) subsystem for a wireless mobile station, which may be employed with aspects of the disclosure described herein.

The application processor subsystem 101 as shown in FIG. 7 may include a controller 108 such as a microcontroller, another processor or other circuitry. The baseband subsystem 102 as shown in FIG. 8 may include a controller 118 such as a microcontroller or other processor. The RF subsystem 104 as shown in FIG. 9 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

In FIG. 7, the Peripherals 114 such as a full or partial keyboard, video or still image display, audio interface, etc. may be employed and managed through the controller 108.

Aspects of the present disclosure may be implemented in firmware of the controller 108 of the application processor in FIG. 7 and/or the controller 118 of the baseband subsystem in FIG. 8. In another alternative, aspects of the present disclosure may also be implemented as a combination of firmware and hardware of the application processor subsystem 101 of FIG. 7 and/or the baseband subsystem 102 of FIG. 8. For instance, a signal processing entity of any or all of the FIG. 8 may be implemented in firmware, hardware and/or software. It may be part of the baseband subsystem, the receiver subsystem or be associated with both subsystems. In one example, the controller 118 and/or the signal processor 110 in FIG. 8 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use this disclosure may include smartphones, tablets, laptops, gaming consoles, cameras, video camcorders, car entertainment systems, etc.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for error correction at a receiver in a communication network, the method comprising:
controlling, by a processing device at the receiver,
receiving, from another communication device, a plurality of communication signals of a 3rd Generation Partnership Project (3GPP) based wireless communication system having respectively a plurality of versions of a same block of data, wherein the plurality of communication signals includes an initial transmission as a first communication signal and at least two communication signals transmitted based on a data block retransmission communication exchange between the receiver and the another communication device;
storing, as erroneous versions of the same block of data, a first plurality of versions of the same block of data, among the plurality of versions of the same block of data, which are determined to be erroneous;
combining each of the erroneous versions of the same block of data, by applying a majority decision criterion for each bit position of the same block of data determined to have a mismatch of values respectively among the erroneous versions of the same block of data, to obtain an error free version of the same block of data; and
when each said version of the same block of data received is a version of a same packet including a header indicating a serial number and a payload data portion, in which in a given version of the same packet received the header is not encoded separately from the payload data portion, determining a serial number of an erroneous version of a first packet received, by examining serial numbers respectively of an error-free version of at least one second packet received before and an error-free version of at least one third packet received after the erroneous version of the first packet is received.

2. The method of claim 1, further comprising:
controlling, by the processing device, determining, for each given bit position of each of the erroneous versions of the same block of data, whether a value of the given bit position in one of the erroneous versions of the same block of data is different from a value of the given bit position in another of the erroneous versions of the same block of data.

3. The method of claim 1, wherein a number of the erroneous versions of the same block of data is at least three.

4. The method of claim 3, further comprising:
when the number is an even value and a determination by applying the majority decision criterion to the erroneous versions of the same block of data is a tie for at least one bit position of the same block of data, controlling, by the processing device, requesting retransmission of the same block of data.

5. The method of claim 1, wherein the same block of data is a file.

6. The method of claim 1, further comprising:
controlling, by the processing device,
transmitting an acknowledgement indicating successful receipt of a first block of data which is a fourth packet without a header, after applying the majority decision criterion to erroneous versions of the fourth packet determined based on predetermined information indicating each of a plurality of erroneous versions of given packets received corresponds to a respective given erroneous version of the fourth packet.

7. A method for error correction at a receiver in a communication network, the method comprising:
controlling, by a processing device at the receiver,
receiving, from another communication device, a plurality of communication signals of a 3rd Generation Partnership Project (3GPP) based wireless communication system having respectively a plurality of versions of a same block of data, wherein the plurality of communication signals includes an initial transmission as a first communication signal and at least two communication signals transmitted based on a data block retransmission communication exchange between the receiver and the another communication device;
storing, as erroneous versions of the same block of data, a first plurality of versions of the same block of data, among the plurality of versions of the same block of data, which are determined to be erroneous;
combining each of the erroneous versions of the same block of data, by applying a majority decision criterion for each bit position of the same block of data determined to have a mismatch of values respectively among the erroneous versions of the same block of data, to obtain an error free version of the same block of data; and
when each said version of the same block of data received is a version of a same packet, and each said erroneous version of the same packet includes a header of same length and a payload data portion, in which in each said erroneous version of the same packet the header is not encoded separately from the payload data portion, applying the majority decision criterion to a portion of the headers respectively of the erroneous versions of the same packet, wherein the portion in each of the headers includes a same content at a time of retransmission of a given version of the same packet.

8. A method for error correction at a receiver in a communication network, the method comprising:
controlling, by a processing device at the receiver, receiving, from another communication device, a plurality of communication signals of a 3rd Generation Partnership Project (3GPP) based wireless communication system having respectively a plurality of versions of a same block of data, wherein the plurality of communication signals includes an initial transmission as a first communication signal and at least two communication signals transmitted based on a data block retransmission communication exchange between the receiver and the another communication device;

storing, as erroneous versions of the same block of data, a first plurality of versions of the same block of data, among the plurality of versions of the same block of data, which are determined to be erroneous;

combining each of the erroneous versions of the same block of data, by applying a majority decision criterion for each bit position of the same block of data determined to have a mismatch of values respectively among the erroneous versions of the same block of data, to obtain an error free version of the same block of data; and when each said version of the block of data received is a version of a same packet, and each said erroneous version of the same packet includes a header and a payload data portion, in which in each said erroneous version of the same packet the header is not encoded separately from the payload data portion, in which the headers of the erroneous versions of the same packet respectively have different bit lengths, and each said erroneous version of the same packet has a length L in bits and a maximum header length in bits of $H_{max}$, applying the majority decision criterion to a last $L-H_{max}$ bit positions respectively in the erroneous versions of the same packet.

9. An apparatus for error correction at a receiver in a communication network, the apparatus comprising:

circuitry at the receiver configured to control:

receiving, from another communication device, a plurality of communication signals of a 3rd Generation Partnership Project (3GPP) based wireless communication system having respectively a plurality of versions of a same block of data, wherein the plurality of communication signals includes an initial transmission as a first communication signal and at least two communication signals transmitted based on a data block retransmission communication exchange between the receiver and the another communication device;

storing, as erroneous versions of the same block of data, a first plurality of versions of the same block of data, among the plurality of versions of the same block of data, which are determined to be erroneous;

combining each of the erroneous versions of the same block of data, by applying a majority decision criterion for each bit position of the same block of data determined to have a mismatch of values respectively among the erroneous versions of the same block of data, to obtain an error free version of the same block of data; and when each said version of the same block of data received is a version of a same packet including a header indicating a serial number and a payload data portion, in which in a given version of the same packet received the header is not encoded separately from the payload data portion, determining a serial number of an erroneous version of a first packet received, by examining serial numbers respectively of an error-free version of at least one second packet received before and an error-free version of at least one third packet received after the erroneous version of the first packet is received.

10. The apparatus of claim 9, further comprising:

wherein the circuitry is configured to control determining, for each given bit position of each of the erroneous versions of the same block of data, whether a value of the given bit position in one of the erroneous versions of the same block of data is different from a value of the given bit position in another of the erroneous versions of the same block of data.

11. The apparatus of claim 9, wherein a number of the erroneous versions of the same block of data is at least three.

12. The apparatus of claim 11, wherein the circuitry is configured to control, when the number is an even value and a determination by applying the majority decision criterion to the erroneous versions of the same block of data is a tie for at least one bit position of the same block of data, requesting retransmission of the same block of data.

13. The apparatus of claim 9, wherein the same block of data is a file.

14. The apparatus of claim 9, wherein the circuitry is configured to control transmitting an acknowledgement indicating successful receipt of a first block of data which is a fourth packet without a header, after applying the majority decision criterion to erroneous versions of the fourth packet determined based on predetermined information indicating each of a plurality of erroneous versions of given packets received corresponds to a respective given erroneous version of the fourth packet.

15. An apparatus for error correction at a receiver in a communication network, the apparatus comprising:

circuitry at the receiver configured to control:

receiving, from another communication device, a plurality of communication signals of a 3rd Generation Partnership Project (3GPP) based wireless communication system having respectively a plurality of versions of a same block of data, wherein the plurality of communication signals includes an initial transmission as a first communication signal and at least two communication signals transmitted based on a data block retransmission communication exchange between the receiver and the another communication device;

storing, as erroneous versions of the same block of data, a first plurality of versions of the same block of data, among the plurality of versions of the same block of data, which are determined to be erroneous;

combining each of the erroneous versions of the same block of data, by applying a majority decision criterion for each bit position of the same block of data determined to have a mismatch of values respectively among the erroneous versions of the same block of data, to obtain an error free version of the same block of data; and when each said version of the same block of data received is a version of a same packet, and each said erroneous version of the same packet includes a header of same length and a payload data portion, in which in each said erroneous version of the same packet the header is not encoded separately from the payload data portion, applying the majority decision criterion to a portion of the headers respectively of the erroneous versions of the same packet, wherein the portion in each of the headers includes a same content at a time of retransmission of a given version of the same packet.

16. An apparatus for error correction at a receiver in a communication network, the apparatus comprising:
circuitry at the receiver configured to control:
receiving, from another communication device, a plurality of communication signals of a 3rd Generation Partnership Project (3GPP) based wireless communication system having respectively a plurality of versions of a same block of data, wherein the plurality of communication signals includes an initial transmission as a first communication signal and at least two communication signals transmitted based on a data block retransmission communication exchange between the receiver and the another communication device;
storing, as erroneous versions of the same block of data, a first plurality of versions of the same block of data, among the plurality of versions of the same block of data, which are determined to be erroneous; and
combining each of the erroneous versions of the same block of data, by applying a majority decision criterion for each bit position of the same block of data determined to have a mismatch of values respectively among the erroneous versions of the same block of data, to obtain an error free version of the same block of data; and
when each said version of the block of data received is a version of a same packet, and each said erroneous version of the same packet includes a header and a payload data portion, in which in each said erroneous version of the same packet the header is not encoded separately from the payload data portion, in which the headers of the erroneous versions of the same packet respectively have different bit lengths, and each said erroneous version of the same packet has a length L in bits and a maximum header length in bits of $H_{max}$ applying the majority decision criterion to a last $L-H_{max}$ bit positions respectively in the erroneous versions of the same packet.

17. A wireless communication device in a communication network, the wireless communication comprising:
a receiver to receive a wireless communication; and
a processing device configured for error correction,
wherein the processing device is configured to control
receiving at the receiver, from another communication device, a plurality of communication signals of a 3rd Generation Partnership Project (3GPP) based wireless communication system having respectively a plurality of versions of a same block of data, wherein the plurality of communication signals includes an initial transmission as a first communication signal and at least two communication signals transmitted based on a data block retransmission communication exchange between the receiver and the another communication device;
storing, as erroneous versions of the same block of data, a first plurality of versions of the same block of data, among the plurality of versions of the same block of data, which are determined to be erroneous; and
combining each of the erroneous versions of the same block of data, by applying a majority decision criterion for each bit position of the same block of data determined to have a mismatch of values respectively among the erroneous versions of the same block of data, to obtain an error free version of the same block of data; and
when each said version of the same block of data received is a version of a same packet including a header indicating a serial number and a payload data portion, in which in a given version of the same packet received the header is not encoded separately from the payload data portion, determining a serial number of an erroneous version of a first packet received, by examining serial numbers respectively of an error-free version of at least one second packet received before and an error-free version of at least one third packet received after the erroneous version of the first packet is received.

18. The wireless communication device of claim 17, wherein the processing device is configured to control determining, for each given bit position of each of the erroneous versions of the same block of data, whether a value of the given bit position in one of the erroneous versions of the same block of data is different from a value of the given bit position in another of the erroneous versions of the same block of data.

19. A wireless communication device in a communication network, the wireless communication comprising:
a receiver to receive a wireless communication; and
a processing device configured for error correction,
wherein the processing device is configured to control
receiving at the receiver, from another communication device, a plurality of communication signals of a 3rd Generation Partnership Project (3GPP) based wireless communication system having respectively a plurality of versions of a same block of data, wherein the plurality of communication signals includes an initial transmission as a first communication signal and at least two communication signals transmitted based on a data block retransmission communication exchange between the receiver and the another communication device;
storing, as erroneous versions of the same block of data, a first plurality of versions of the same block of data, among the plurality of versions of the same block of data, which are determined to be erroneous;
combining each of the erroneous versions of the same block of data, by applying a majority decision criterion for each bit position of the same block of data determined to have a mismatch of values respectively among the erroneous versions of the same block of data, to obtain an error free version of the same block of data; and
when each said version of the same block of data received is a version of a same packet, and each said erroneous version of the same packet includes a header of same length and a payload data portion, in which in each said erroneous version of the same packet the header is not encoded separately from the payload data portion, applying the majority decision criterion to a portion of the headers respectively of the erroneous versions of the same packet, wherein the portion in each of the headers includes a same content at a time of retransmission of a given version of the same packet.

20. A wireless communication device in a communication network, the wireless communication comprising:
a receiver to receive a wireless communication; and
a processing device configured for error correction, wherein the processing device is configured to control
receiving at the receiver, from another communication device, a plurality of communication signals of a 3rd Generation Partnership Project (3GPP) based wireless communication system having respectively a plurality of versions of a same block of data, wherein the plurality of communication signals includes an initial transmission as a first communication signal and at least two communication signals transmitted based on a data block retransmission communication exchange between the receiver and the another communication device;

storing, as erroneous versions of the same block of data, a first plurality of versions of the same block of data, among the plurality of versions of the same block of data, which are determined to be erroneous;

combining each of the erroneous versions of the same block of data, by applying a majority decision criterion for each bit position of the same block of data determined to have a mismatch of values respectively among the erroneous versions of the same block of data, to obtain an error free version of the same block of data; and when each said version of the block of data received is a version of a same packet, and each said erroneous version of the same packet includes a header and a payload data portion, in which in each said erroneous version of the same packet the header is not encoded separately from the payload data portion, in which the headers of the erroneous versions of the same packet respectively have different bit lengths, and each said erroneous version of the same packet has a length L in bits and a maximum header length in bits of $H_{max}$, applying the majority decision criterion to a last $L-H_{max}$ bit positions respectively in the erroneous versions of the same packet.

* * * * *